United States Patent [19]
Ciboldi

[11] Patent Number: 5,099,389
[45] Date of Patent: Mar. 24, 1992

[54] GAS-INSULATED ELECTRIC SWITCHBOARD

[75] Inventor: Pietro Ciboldi, Bergamo, Italy

[73] Assignee: ABB Sace S.p.A., Bergamo, Italy

[21] Appl. No.: 629,676

[22] Filed: Dec. 18, 1990

[30] Foreign Application Priority Data

Jun. 2, 1989 [IT] Italy .................... 20760 A/89

[51] Int. Cl.⁵ .................................. H02B 13/04
[52] U.S. Cl. ...................... 361/341; 174/17 GF; 200/148 R; 361/335
[58] Field of Search ........... 174/176 F; 307/113, 307/147, 148; 200/148 R, 148 B; 361/332, 333, 334, 335, 341, 356, 357, 361, 390

[56] References Cited

U.S. PATENT DOCUMENTS

| | | | |
|---|---|---|---|
| 3,619,726 | 11/1971 | Boersma | 361/341 |
| 4,241,379 | 12/1980 | Olsen | 361/341 |
| 4,774,628 | 9/1988 | Diaferia | 361/335 |
| 5,003,427 | 3/1991 | Reichl | 361/341 |

FOREIGN PATENT DOCUMENTS

| | | |
|---|---|---|
| 002440 | 6/1979 | European Pat. Off. |
| 024494 | 3/1981 | European Pat. Off. |
| 253317 | 1/1988 | European Pat. Off. ...... 174/17 GF |
| 3522539 | 1/1987 | Fed. Rep. of Germany |
| 2555830 | 5/1985 | France |
| 611229 | 10/1948 | United Kingdom ................ 361/341 |

Primary Examiner—Gerald P. Tolin
Attorney, Agent, or Firm—Burns, Doane, Swecker & Mathis

[57] ABSTRACT

An electric switchboard for medium voltages provides for the insulation of the compartments by means of sulfur hexafluoride gas, and each compartment is subdivided into superimposed cells which are metallically separated from one another and are gastight. In the cells auxiliary isolators are also provided for electrically isolating parts of the compartment for the purpose of maintenance without putting the entire switchboard out of action.

8 Claims, 6 Drawing Sheets

GAS-INSULATED ELECTRIC SWITCHBOARD

FIELD OF THE INVENTION

This is a continuation of international application PCT/EP 90/00824 filed on May 22, 1990 designating the United States. The international application is entitled to the foreign priority filing date of Italian patent application 20760A/89 filed on June 2, 1989.

The present invention relates to electric switchboards for supplying apparatus and plants, and in particular, but not exclusively, for medium voltage supplies, that is to say for voltages between 7.2 and 52 kV.

DISCUSSION OF BACKGROUND

Electric switchboards are divided vertically into compartments, each of which is generally associated with a consumer and through which extends a three phase supply line from which are branched off busbars carrying the voltage to the various consumers. Between the main busbars and the line are disposed circuit breakers, isolators and other measuring, protection and like devices.

For maintenance, inspection and repair purposes one or more parts of a compartment can be removed after only the compartment in question has been isolated and put out of action, so that access can be gained to the various parts of the compartment concerned.

It has recently been proposed to fill the compartments with an insulating gas at low pressure, particularly with sulfur hexafluoride ($SF_6$), in order to gain certain advantages over switchboards at present in use, including a reduction of the dimensions of the switchboard, insensitivity of components to the environment, and the elimination of fire hazard. The use of $SF_6$ or other gas under pressure nevertheless entails various problems when inspection, maintenance and test operations have to be carried out. In such cases it is in fact necessary to evacuate the compartment, with the consequence that the entire switchboard is put out of action, since the switchboard by itself, without the gas, no longer dependably provides the operating conditions for which it was designed.

Putting the switchboard out of action is particularly burdensome because it means that stations or plants will be inoperative even for simple periodic supervisory measures, which of course are essential for safety reasons. Access to various parts of the switchboard also becomes complicated because the indispensable leaktight construction of the compartment makes the removal and/or separation of parts more difficult.

Consequently, known switchboards utilizing a gas as insulant have disadvantages and limitations which impede their wider generalized use.

SUMMARY OF THE INVENTION

Accordingly, one object of this invention is to provide a novel switchboard which overcomes the disadvantages and limitations indicated above for gas-insulated electric switchboards, and which in particular allows easy access to the various parts of the compartment for the purpose of making measurements and tests for maintenance operations in general, without at the same time putting the switchboard itself out of action.

These aims are achieved according to the invention, which consists of an electric switchboard for supplying apparatus and plants, which comprises a plurality of compartments disposed side by side, wherein each compartment is subdivided into three or more superimposed cells metallically separated leaktightly from one another and containing an insulating gas, and wherein in two or more cells of the same compartment auxiliary isolators are provided for electrically isolating a cell for the purpose of inspection, maintenance and measurement operations, while the switchboard remains in service.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
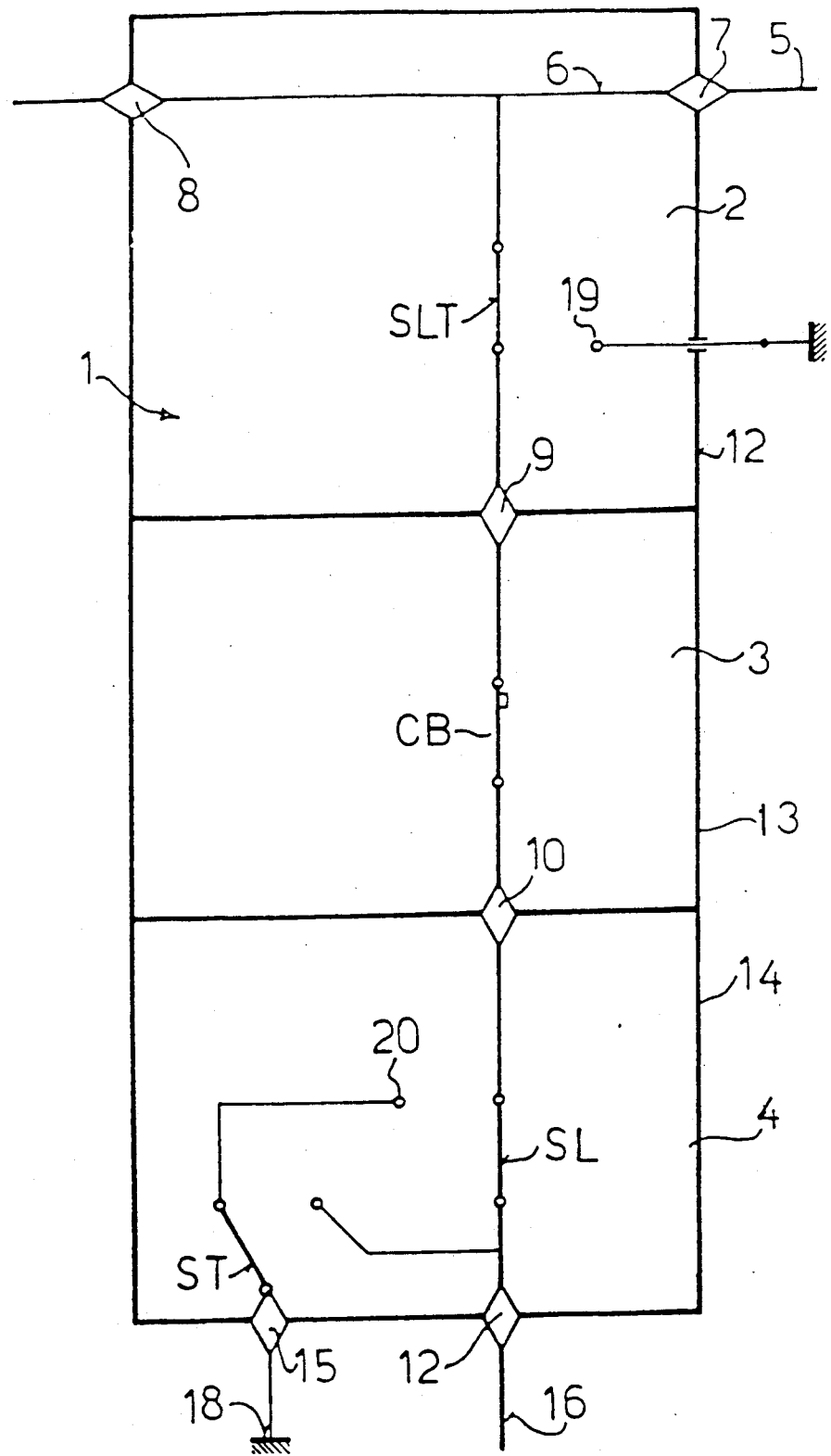
FIG. 1(a) shows schematically the structure of a compartment of the switchboard according to the invention, in the operating configuration.
Figure 1B:
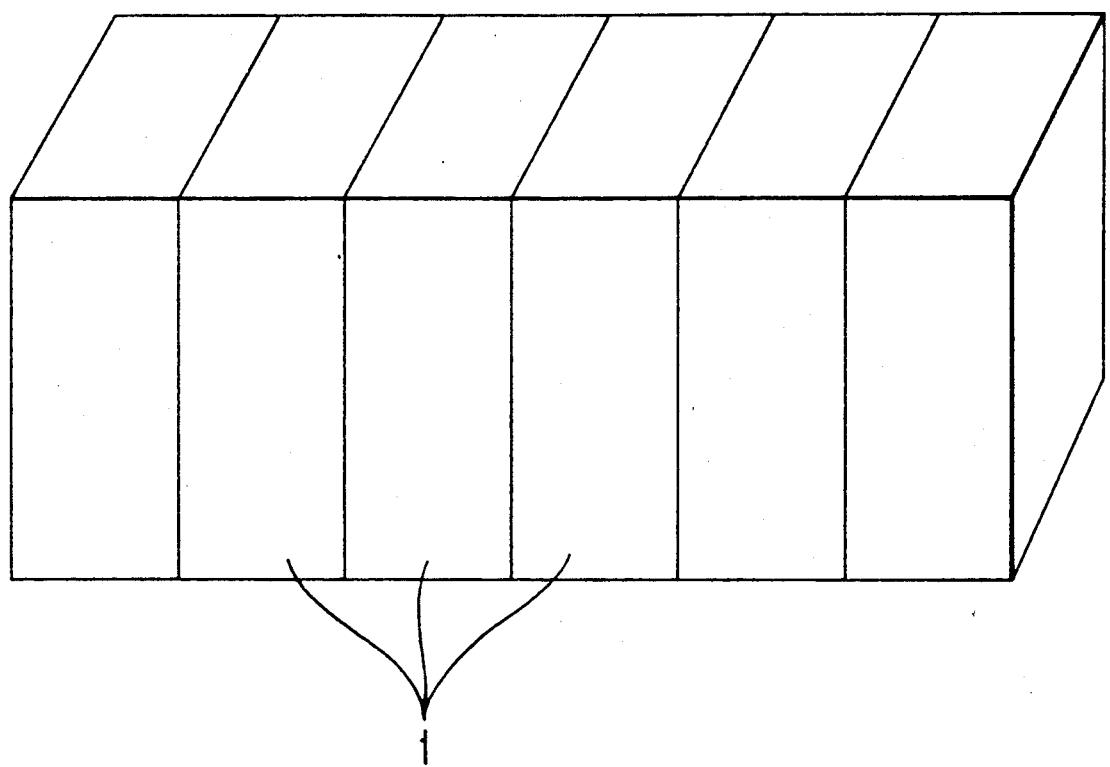
FIG. 1(b) shows a three-dimensional view of plural switchboard compartments arranged according to the present invention.

Referring now to the drawings, wherein like reference numerals designate identical or corresponding parts throughout the several views, in FIG. 1(a) a compartment 1 of the switchboard according to the invention is shown schematically. A three-dimensional view of plural switchboard compartments is illustrated in FIG. 1(b). This compartment is subdivided vertically into three superimposed cells, namely a busbar cell 2, a circuit breaker cell 3, and a line cell 4. Each cell is enclosed in a metal housing 12; 13 and 14 respectively, which hermetically isolates it from the environment and from the other cells, that is to say both from the cells of the same compartment and from adjacent cells (not shown) of the other compartments of the switchboard.

In the case of a "LEAD-IN" compartment, the line cell 4 is connected to the supply network via an insulated leakproof bushing 12, while the busbars 5 carrying the supply to the various consumers pass through the busbar cell 2 by way of bushings 7 and 8, while between said two cells is disposed the circuit breaker cell 3 containing the circuit breaker CB for cutting off the supply. This cell communicates electrically with the other cells by way of bushings 9 and 10.

Each of the cells 2 and 3 is filled with sulfur hexafluoride ($SF_6$) gas and contains means (not shown) for the introduction and discharge of the gas.

According to the invention auxiliary isolators are provided, such as the isolator SLT in the busbar cell 2 and the isolators SL and ST in the line cell 4. This arrangement of the isolators, like the arrangement comprising three cells, is purely an example of one possible embodiment of the invention.

The isolator SLT makes it possible to interrupt the connection between the circuit breaker CB in the cell 3 and the busbars 6 passing through the busbar cell 2. In this case use is made of a two-position type isolator (on ground), which in the second position connects the isolator SLT to a grounding point 19.

The isolator SL of the cell 4 makes it possible to isolate the line from its connection to the circuit breaker CB by way of the bushing 10, and is also of the two-position type. In one position, as shown in FIG. 1, which corresponds to the operating position, it connects the line 16 to the circuit breaker CB. In the off position the isolator SL connects the end of the circuit breaker I to a point 20 to which is also connected another isolator ST capable of connecting said point to the exterior of the compartment by way of an insulating bushing 15. The isolator ST can assume two positions: a first position (visible in FIG. 3) in which it connects an outside source for cable tests; and a second position (visible in FIG. 4) in which the isolator ST is connected to the isolator SL (and therefore to the circuit breaker) for measurements on the circuit breaker CB. In the configuration shown in FIG. 1 the point 20 is connected to ground 18, although this connection can be changed, as will be seen later on.

In the configuration shown in FIG. 1 the isolators SLT and SL and also the circuit breaker I are closed, so that the busbar 5 supplying apparatus is connected to the line 16.

Figure 2:
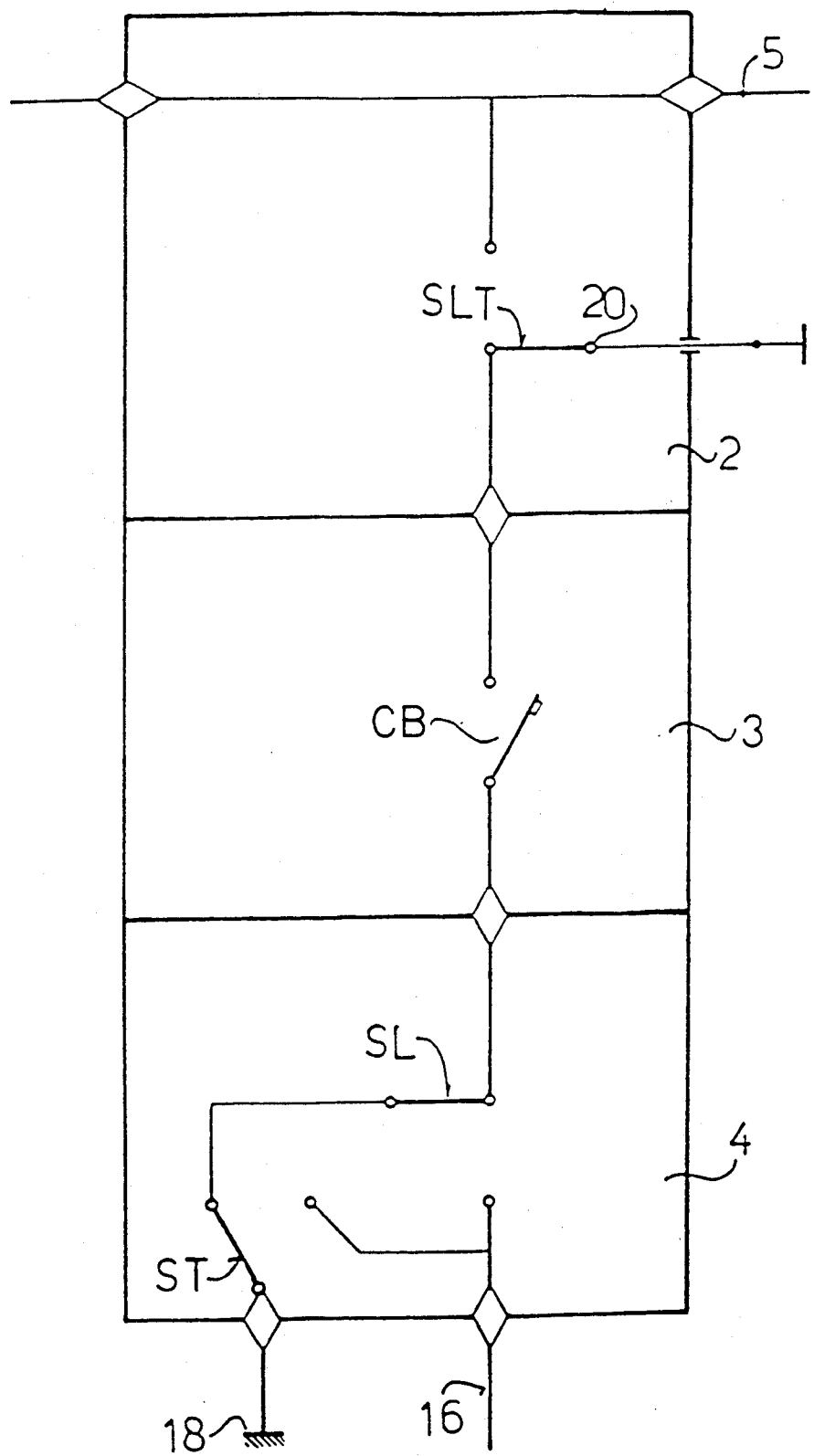
FIGS. 2 to 5 illustrate various isolated states of the switchboard providing for various tests, measurements, and inspections which can be made on the switchboard according to the invention.

In FIG. 2 the compartment is shown in the inoperative configuration, that is to say with the circuit breaker CB open and with the isolators SLT and SL also open and connecting the corresponding ends of the circuit breaker CB to ground. In this configuration it is possible to carry out inspection and maintenance of the circuit breaker, optionally after proceeding to discharge the insulating gas from the circuit breaker cell 3.

Figure 3:
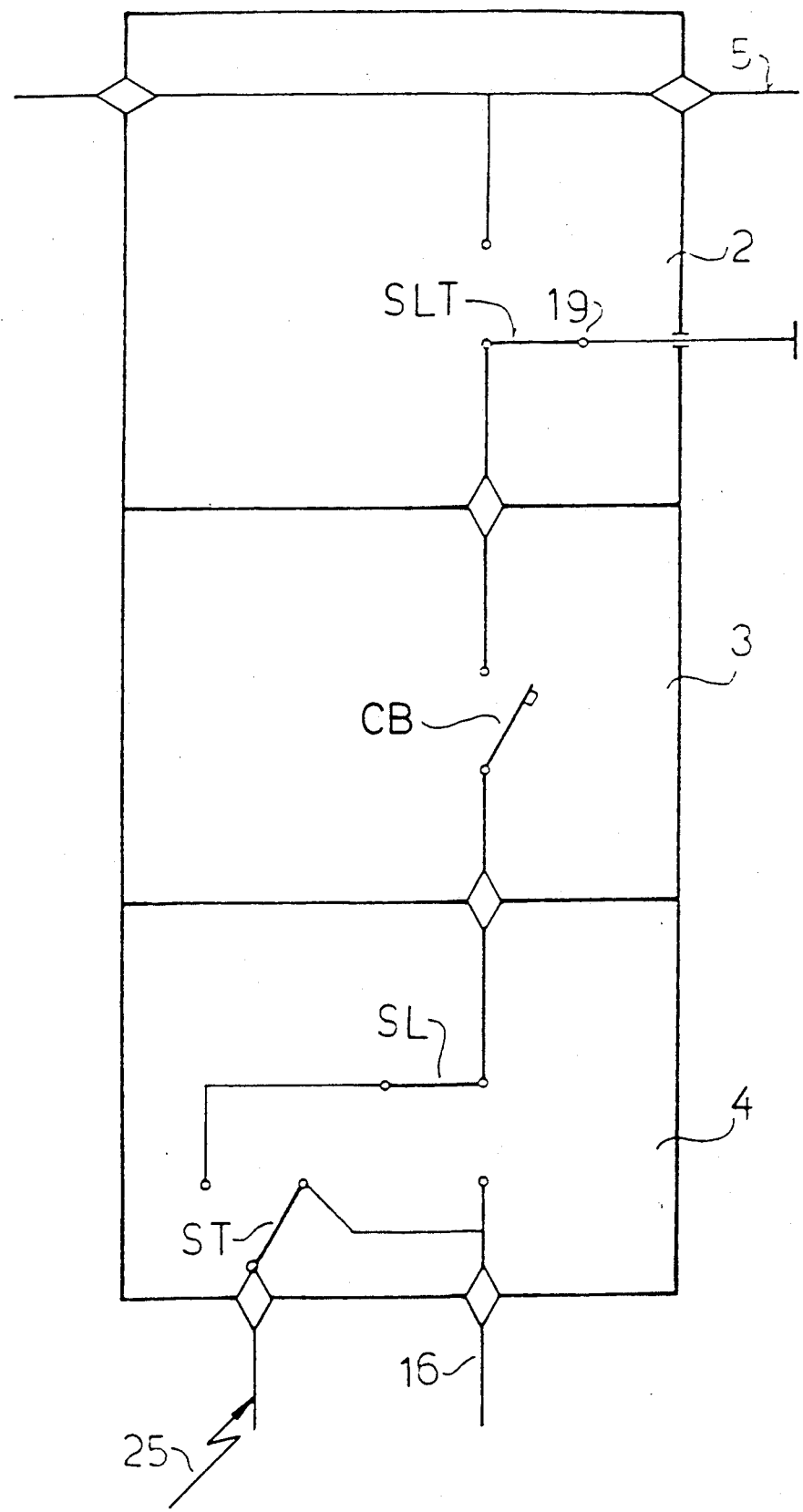

In FIG. 3 a configuration is shown which makes it possible to make an insulation test on the line cable carrying the supply or, for line compartments, on the cable carrying the supply from the compartment to the consumer.

As can be seen in the figure, the circuit breaker CB is open, the isolator SLT of the busbar cell 2 is open and connects the end of the circuit breaker to ground, the isolator SL of the line cell 4 is open, and finally the isolator ST of the same cell is open but not connected to ground as under operating conditions, but connected to the line. By supplying voltage from an external source 25 a test can be made on the cable connecting the consumer loads.

Figure 4:
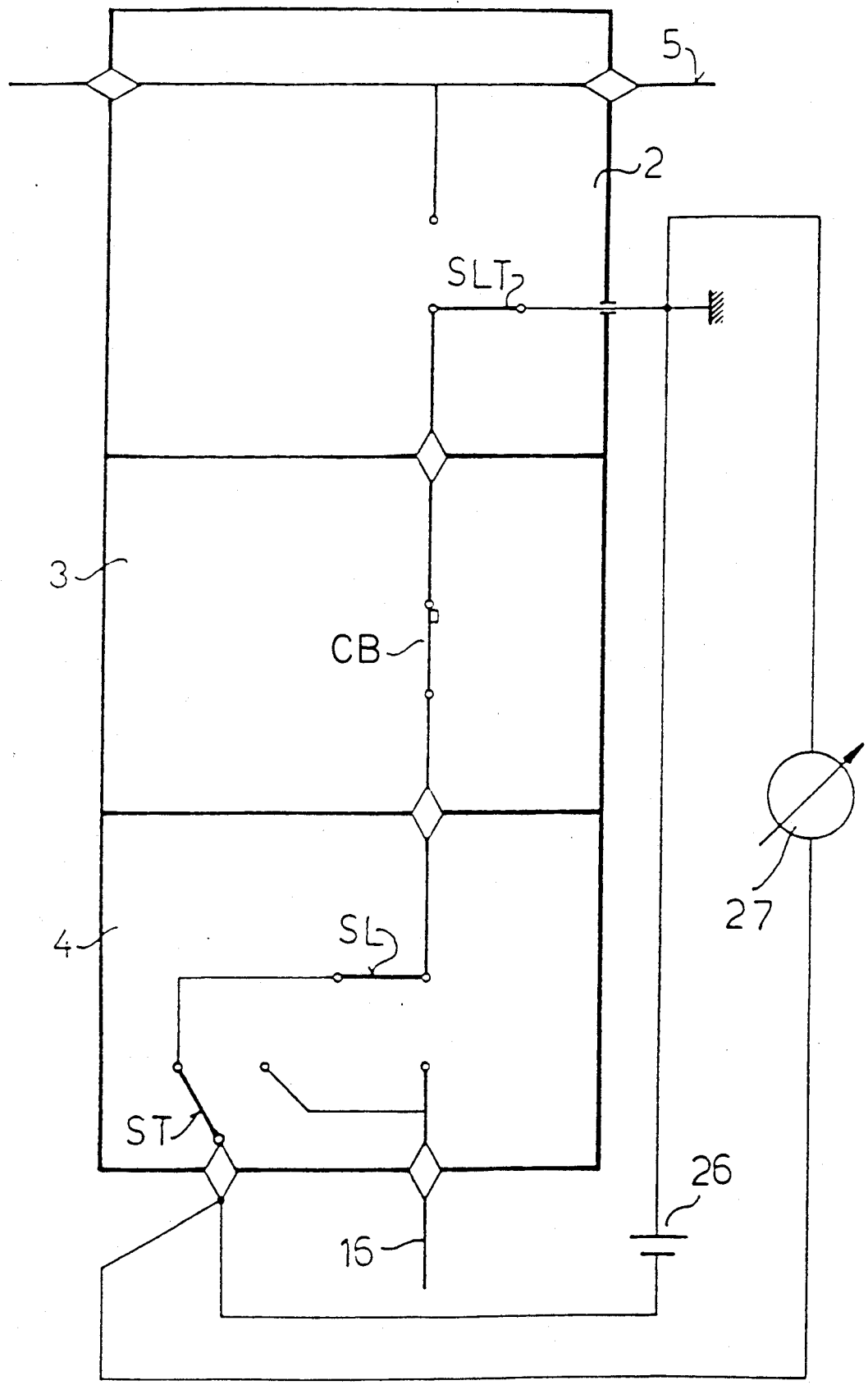

The configuration shown in FIG. 4 enables a measurement to be made of the voltage drop on the circuit breaker, and for that purpose, with the circuit breaker CB in the closed position, the isolator SLT is opened and connected to ground, the isolators SL and ST are connected together, and a measuring circuit is disposed between them and ground, this circuit including a direct voltage source 26 and a millivoltmeter 27 which makes it possible to measure the voltage drop of the circuit and indirectly that of the circuit breaker CB.

Devices of a mechanical type are obviously provided, or mechanical interlocks, (not shown) to prevent incorrect operation of the various electrical components.

Figure 5:
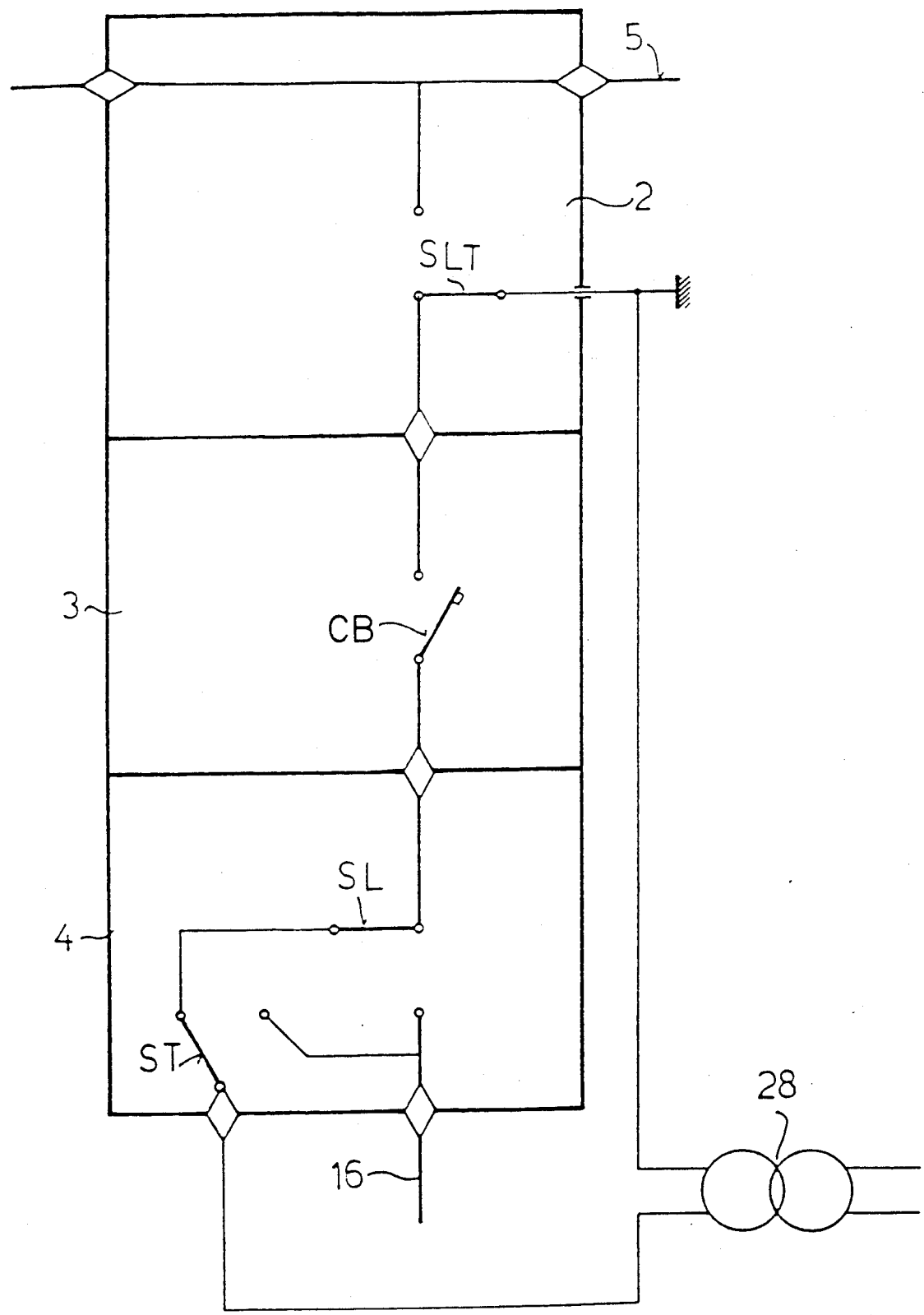

Referring to FIG. 5, it is possible to make a dielectric check on the circuit breaker by means of a configuration which provides for the opening of the circuit breaker CB, the opening and grounding of the isolator SLT, the connection of ST to SL, and the connection of a transformer 28 which applies voltage to the ends of the circuit breaker CB. It is thus possible to check the electrical insulation between the input and the output of the circuit breaker by means of a dielectric strength measurement or test at 50 Hz.

By means of a similar procedure it is also possible to make an insulation test on the circuit breaker, either between the poles or between the poles and ground.

From the foregoing it is clear that the segregation of the individual cells makes it possible to restrict considerably any damage that may be caused by an arc developed inside a cell, preventing it from being propagated to the entire compartment.

Furthermore, various different measures may be carried out on a compartment, which have in part been illustrated, while some parts of the busbar and of the line remain under tension.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electric switchboard, comprising:
   a plurality of compartments disposed side by side;
   at least three superimposed cells filled with insulating gas and subdividing one of said compartments;
   metal housings separating and hermetically sealing said at least three cells from one another and from the environment;
   current conductors arranged inside said at least three cells and connected to a busbar and to a line;
   airtight bushings between said metal housings passing the current conductors, the busbar, and the line through said metal housings;
   a circuit breaker arranged in a first of said at least three cells;
   a first isolator which together with a part of said busbar is arranged in a second of said at least three cells and which in a first position connects said busbar to said circuit breaker;
   a second isolator which together with a part of the line is arranged in a third of said at least three cells and which in a first position connects said circuit breaker to said line; and
   a third isolator arranged in said third cell wherein depending on the position of said first, second, and third isolators, selectively connects the line or the circuit breaker to an external connection for inspection, maintenance or testing while the switchboard remains in service.

2. The electric switchboard according to claim 1 wherein said first and second isolators are two-way-isolators, said first isolator connecting in a second position said circuit breaker to ground and said second isolator connecting in a second position said circuit breaker to a contact which is connected to a contact of said third isolator.

3. The electric switchboard according to claim 2 wherein said third isolator is a two-way-isolator having a first position connecting said line to a current conductor of a bushing of said third cell, which bushing conductor is passes through the metal housing of said third cell to the environment, and a second position connecting said contact of said second isolator to said bushing conductor.

4. The electric switchboard according to claim 3 wherein during operation of said switchboard said first and second isolators are in their first positions and said bushing conductor is connected to ground.

5. The electric switchboard according to claim 3 wherein during inspection and maintenance of said switchboard said first, second, and third isolators are in their second positions and said bushing conductor is connected to ground.

6. The electric switchboard according to claim 3 wherein for line testing, said first and second isolators are in their second position, said third isolator is in its first positions and said bushing conductor is connected to an outside voltage source.

7. The electric switchboard according to claim 3 wherein for measuring the voltage across said circuit breaker said first, second, and third isolators are in their second positions, and said bushing conductor is connected to an outside direct voltage source and a voltage measuring device.

8. The electric switchboard according to claim 3 wherein dielectric testing of said circuit breaker said first, second, and third isolators are in their second positions, and said bushing conductor is connected to a transformer which supplies voltage to terminals of said circuit breaker.

* * * * *